US012655300B2

(12) United States Patent
Bao et al.

(10) Patent No.: US 12,655,300 B2
(45) Date of Patent: Jun. 16, 2026

(54) COATING FILMS AND DISPLAY PANELS

(71) Applicant: SHENZHEN CHINA STAR OPTOELECTRONICS SEMICONDUCTOR DISPLAY TECHNOLOGY CO., LTD., Shenzhen (CN)

(72) Inventors: Aibing Bao, Shenzhen (CN); Miao Zhou, Shenzhen (CN); Lixuan Chen, Shenzhen (CN)

(73) Assignee: SHENZHEN CHINA STAR OPTOELECTRONICS SEMICONDUCTOR DISPLAY TECHNOLOGY CO., LTD., Shenzhen (CN)

( * ) Notice: Subject to any disclaimer, the term of this patent is extended or adjusted under 35 U.S.C. 154(b) by 160 days.

(21) Appl. No.: 18/523,544

(22) Filed: Nov. 29, 2023

(65) Prior Publication Data

US 2025/0034405 A1 Jan. 30, 2025

(30) Foreign Application Priority Data

Jul. 12, 2023 (CN) ......................... 202310856320.6

(51) Int. Cl.

| | |
|---|---|
| ***C09D 4/00*** | (2006.01) |
| ***B32B 27/30*** | (2006.01) |
| ***C08K 9/04*** | (2006.01) |
| ***C09D 7/40*** | (2018.01) |
| ***C09D 7/62*** | (2018.01) |
| ***C09D 129/10*** | (2006.01) |
| ***C09D 135/02*** | (2006.01) |

(52) U.S. Cl.

CPC .............. *C09D 4/00* (2013.01); *B32B 27/308* (2013.01); *C09D 7/62* (2018.01); *C09D 7/67* (2018.01); *C09D 7/68* (2018.01); *C09D 7/69* (2018.01); *C09D 129/10* (2013.01); *C09D 135/02* (2013.01); *B32B 2250/02* (2013.01); *B32B 2255/10* (2013.01); *B32B 2255/26* (2013.01); *B32B 2255/28* (2013.01); *B32B 2264/1021* (2020.08); *B32B 2264/301* (2020.08); *B32B 2264/302* (2020.08); *B32B 2264/402* (2020.08); *B32B 2307/536* (2013.01); *B32B 2457/20* (2013.01); *C08K 9/04* (2013.01)

(58) Field of Classification Search

None

See application file for complete search history.

(56) References Cited

FOREIGN PATENT DOCUMENTS

CN 111440525 A * 7/2020 ........... C08G 18/673

OTHER PUBLICATIONS

Yu, Hao-jie, CN-111440525-A, Jul. 24, 2020 (machine translation) (Year: 2020).*

German Office Action issued in corresponding German Patent Application No. 10 2023 132 083.1 dated Apr. 1, 2025, with English translation; 21 pages provided.

* cited by examiner

*Primary Examiner* — Cheng Yuan Huang

(74) *Attorney, Agent, or Firm* — HSML P.C.

(57) ABSTRACT

The present disclosure provides a coating film and a display panel, wherein the coating film includes a tetrafunctional polyurethane acrylate oligomer having a structure as shown below. The coating film according to the present disclosure can enhance the adhesion force to a polymethyl methacrylate film.

20 Claims, 1 Drawing Sheet

COATING FILMS AND DISPLAY PANELS

CROSS-REFERENCE TO RELATED APPLICATIONS

This application claims priority to Chinese Patent Application No. 202310856320.6, filed on Jul. 12, 2023, the contents of which are incorporated herein by reference in its entirety.

TECHNICAL FIELD

The present disclosure relates to the field of polymer materials, and more particularly, to a coating film and a display panel.

BACKGROUND

Polymethyl methacrylate (PMMA) is a typical thermoplastic amorphous polymer, which is uniform in texture, and its internal molecular arrangement does not affect the passing of light, so that it has excellent optical properties and has great application prospects in the field of displays.

However, the surface hardness of a PMMA film is generally insufficient, so the PMMA film is easily scratched by a hard object when applied to the outer surface of the display, thereby affecting its optical effect. Therefore, it is necessary to harden the surface of the PMMA film.

It is known from the molecular structure of PMMA

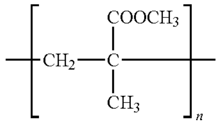

that, there are only ester groups with relatively low polarity in the molecular structure. The material of a hardened coating layer generally has a relatively high functionality. Therefore, the hardened coating layer formed directly on the surface of the PMMA film may have a large internal stress, resulting in a problem of poor adhesion between the hardened coating layer and the PMMA film.

SUMMARY

In view of the above, the present disclosure provides a coating film and a display panel, which may be capable of enhancing adhesion to a PMMA film.

An embodiment of the present disclosure provides a coating film including a tetrafunctional polyurethane acrylate oligomer having a structure as shown below:

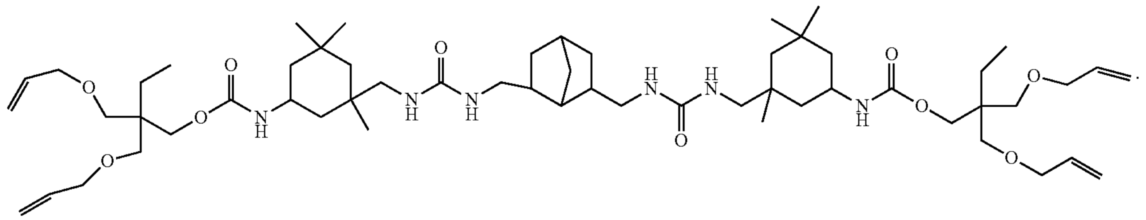 [SMILES: C=CCOCC(CC)(COCC=C)COC(=O)NC1CC(C)(C)CC(C)(CNC(=O)NCC2CC3CC(CNC(=O)NCC4(C)CC(NC(=O)OCC(CC)(COCC=C)COCC=C)CC(C)(C)C4)C2C3)C1]

An embodiment of the present disclosure provides a coating film including:

- a first sub-coating film including a tetrafunctional polyurethane acrylate oligomer having a structure as shown below:

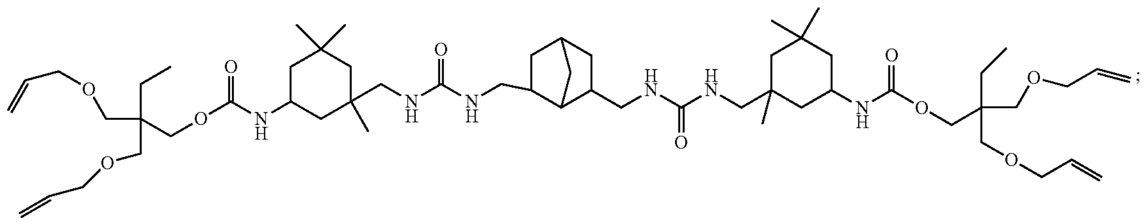 [SMILES: C=CCOCC(CC)(COCC=C)COC(=O)NC1CC(C)(C)CC(C)(CNC(=O)NCC2CC3CC(CNC(=O)NCC4(C)CC(NC(=O)OCC(CC)(COCC=C)COCC=C)CC(C)(C)C4)C2C3)C1]

and

- a second sub-coating film disposed on a surface of the first sub-coating film.

An embodiment of the present disclosure further provides a display panel including:

- a panel body;
- a polymethyl methacrylate film disposed on a surface of the panel body; and
- a coating film disposed on a surface of the polymethyl methacrylate film away from the panel body, wherein the coating film includes a tetrafunctional polyurethane acrylate oligomer having a structure as follows:

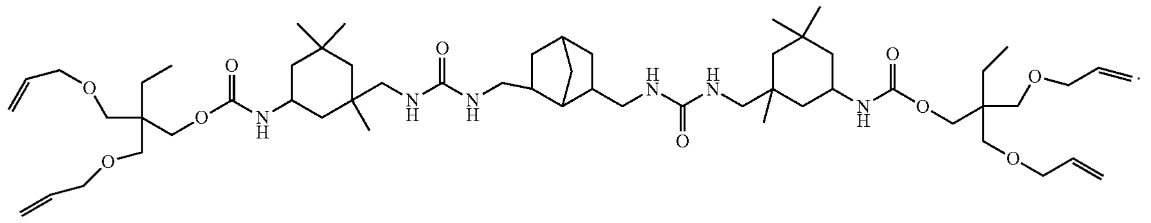 [SMILES: C=CCOCC(CC)(COCC=C)COC(=O)NC1CC(C)(C)CC(C)(CNC(=O)NCC2CC3CC(CNC(=O)NCC4(C)CC(NC(=O)OCC(CC)(COCC=C)COCC=C)CC(C)(C)C4)C2C3)C1]

The coating film according to the present disclosure includes the tetrafunctional polyurethane acrylate oligomer having the illustrated structure, and thus more N—H moieties are contained in the molecular structure of the coating film and may form hydrogen bonds with O atoms of the ester groups of PMMA, thereby enhancing intermolecular interaction between the coating film and the PMMA film, and thus enhancing adhesion of the coating film to the PMMA film.

DETAILED DESCRIPTION OF THE EMBODIMENTS

Figure 1:
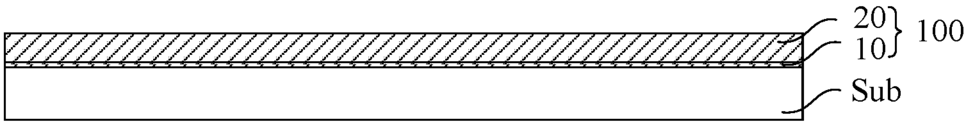
FIG. 1 is a schematic diagram of a positional relationship of a coating film to a PMMA film according to an embodiment of the present disclosure.

An embodiment of present disclosure provides a coating film and a display panel. Various embodiments of the present disclosure are described in the form of ranges, which are only for convenience and brevity and should not be construed as a limitation on the scope of the application. Thus, the description of the ranges includes all possible sub-ranges as well as a single numerical value within those ranges. For example, the description of the range from 1 to 6 should be considered to specifically include sub-ranges, e.g., from 1 to 3, from 1 to 4, from 1 to 5, from 2 to 4, from 2 to 6, from 3 to 6, or the like, as well as single numbers within the ranges, e.g., 1, 2, 3, 4, 5, or 6. Additionally, numerical ranges herein include any quoted numbers (fractions or integers) within the referred ranges.

An embodiment of the present disclosure provides a coating film disposed on a surface of a film. Specifically, a material of the film is polymethyl methacrylate (PMMA), which may be disposed on an outer side of a display panel to protect the display panel. The thickness of the coating film may be 10 nm to 1,000 nm, specifically 20 nm to 500 nm, and more specifically 50 nm to 200 nm. The coating film may be formed on the surface of the film by a winding coating method. Specific examples of winding coating methods include, but are not limited to, roller coating, gravure coating, reverse coating, roller brushing, dip coating, spray coating, spin coating, pneumatic blade coating, mold coating, or the like.

The coating film comprises a tetrafunctional polyurethane acrylate oligomer having a structure as shown below:

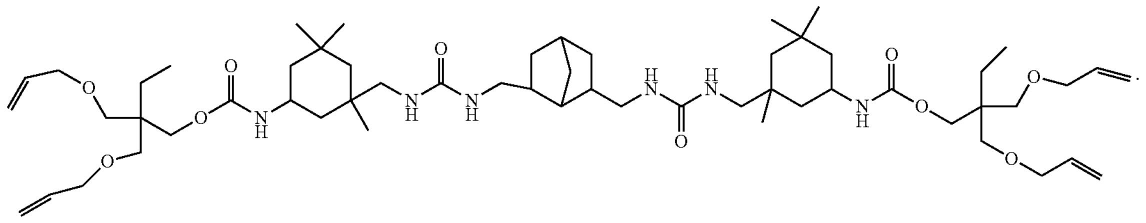 [SMILES: C=CCOCC(CC)(COCC=C)COC(=O)NC1CC(C)(C)CC(C)(CNC(=O)NCC2CC3CC(CNC(=O)NCC4(C)CC(NC(=O)OCC(CC)(COCC=C)COCC=C)CC(C)(C)C4)C2C3)C1]

The molecular structure of the tetrafunctional polyurethane acrylate oligomer contains a plurality of N—H structures, which can form hydrogen bonds with O atoms of ester groups of PMMA, thereby enhancing the molecular interaction between the coating film and the PMMA film, and further enhancing the adhesion of the coating film to the PMMA film.

The coating film further comprises nano-silica particles. The surface of the nano-silica particles is rich in hydroxyl groups, which may form hydrogen bonds with O atoms of the ester groups of the PMMA molecular, enhancing the intermolecular interaction of the coating film with PMMA, and further enhancing the adhesion of the coating film to the PMMA film.

The nano-silica particles include isocyanatoethyl acrylate-modified nano-silica particles. Specifically, isocyanoethyl acrylate is used for chemical modification by reacting with hydroxyl groups on the surface of nanosilica particles. The surface of the nano-silica particles modified by isocyanatoethyl acrylate contains acryloyloxy groups, which can react with the tetrafunctional polyurethane acrylate oligomer of the coating film to perform cross-linking, enhancing the adhesion between the nano-silica particles in the coating film and the tetrafunctional polyurethane acrylate oligomer, improving the mechanical properties of the coating film, thereby further improving the hardness of the coating film.

The isocyanatoethyl acrylate-modified nano-silica particles may be partially modified. That is, only a portion of hydroxyl groups on the surface of the nano-silica particle is reacted with isocyanatoethyl acrylate to undergo chemical modification. For the nono-silica particle partially modified by isocyanatoethyl acrylate, unmodified hydroxyl groups may form hydrogen bonds with O atoms of the ester groups of PMMA, thereby further enhancing molecular interaction of the coating film with PMMA, and in turn enhancing adhesion to the PMMA film. In addition, the portion of nano-silica particles modified by isocyanatoethyl acrylate contains acryloyloxy groups, which may be crosslinked with the tetrafunctional polyurethane acrylate oligomer of the coating film, thereby further improving the binding force between the nano-silica particles and the tetrafunctional polyurethane acrylate oligomer in the coating film, and improving the mechanical properties of the coating film. Moreover, the isocyanatoethyl acrylate molecule itself has some steric hindrance, so it is difficult for the nano-silica particles rich in hydroxyl groups to be completely modified, and the degree of modification of the hydroxyl groups on the surface of the nano-silica particles by isocyanatoethyl acrylate can be controlled by adjusting the proportion between the isocyanatoethyl acrylate molecule and the nano-silica particles.

The average particle size of the nano-silica particles may be 10 to 1,000 nm, specifically 20 to 500 nm, and more specifically 50 to 200 nm. The average particle size of the nano-silica particles is set as 10 to 1,000 nm, so that the transmission of light may not be significantly influenced, thereby ensuring a display effect of a display panel to which the nano-silica particles are applied.

The coating film further comprises a first photoinitiator. The first photoinitiator can absorb energy at a certain wavelength under the irradiation by a light source, and produce active intermediates with the ability to initiate polymerization, such as free radicals and cations, thereby triggering the polymerization and crosslinking reaction of prepolymers and monomer components, and finally achieving curing. In particular, the first photoinitiator may include one or more of a type I photoinitiator or a type II photoinitiator. The type I (cleavage type) photoinitiator is one that may be decomposed due to differences in chemical structures or molecular binding energies to generate free radicals. Specific examples of type I photoinitiators include, but not limited to, one or more of acetophenones such as 4-phenoxydichloroacetophenone, 4-tert-butyldichloroacetophenone, 4-tert-butyltrichloroacetophenone, diethoxyacetophenone, 2-hydroxy-2-methyl-1-phenylpropan-1-one, 1-(4-isopropylphenyl)-2-hydroxy-2-methylpropan-1-one, 1-(4-dodecylphenyl)-2-hydroxy-2-methylpropan-1-one, 4-(2-hydroxyethoxy)-phenyl(2-hydroxy-2-propyl) ketone, and 1-hydroxycyclohexylphenyl ketone; benzoins such as benzoin, benzoin methyl ether, benzoin ethyl ether, and benzyl dimethyl ketal; acylphosphine oxides or titanocene compounds. The type II (hydrogen-capturing type) photoinitiator, after absorbing energy, interacts bimolecularly with co-initiators (i.e., hydrogen donors, for example, tertiary amine) in the excited state to produce active free radicals. Specific examples of type II photoinitiators include, but are not limited to, one or more of benzophenones such as benzophenone, benzoylbenzoic acid, benzoylbenzoic acid methyl ether, 4-phenylbenzophenone, hydroxybenzophenone, 4-benzoyl-4'-methyldiphenyl sulfide, and 3,3'-dimethyl-4-methoxybenzophenone; thioxanthones such as thioxanthone, 2-chlorothioxanthone, 2-methylthioxanthone, 2,4-dimethylthioxanthone, and isopropylthioxanthone, or the like.

The coating film comprises 80 to 120 parts by weight of the tetrafunctional polyurethane acrylate oligomer, 1 to 10 parts by weight of the nano-silica particles, and 1 to 10 parts by weight of the first photoinitiator. The term “parts by weight” refers to the mass of each component added. The actual weight of each “part” is not particularly limited, and may be 1 gram, 5 grams, 10 grams, 1 kilogram, 5 kilograms, 10 kilograms, or the like, which may be adjusted according to the requirements of the actual production scale, as long as the proportion of the components is ensured. Specifically, a mass of the tetrafunctional polyurethane acrylate oligomer:a mass of the nano-silica particles:a mass of the first photoinitiator=(80 to 120):(1 to 10):(1 to 10). The above proportions may be based on the tetrafunctional polyurethane acrylate oligomer, and the proportions of the other components with respect to the tetrafunctional polyurethane acrylate oligomer may be freely adjusted within the ranges listed according to the requirements, and the adjustment of the proportions of one component does not affect the adjustment of the proportions of another component.

For ease of coating, the coating film of the present disclosure further comprises a solvent. Specifically, the coating film may comprise 4,000 to 5,000 parts by weight of a solvent, that is, a mass of the tetrafunctional polyurethane acrylate oligomer: a mass of the solvent=(80 to 120):(4,000 to 5,000), based on the tetrafunctional polyurethane acrylate oligomer. The proportions of the solvent to the tetrafunctional polyurethane acrylate oligomer may be freely adjusted as desired within the ranges listed. Specific examples of solvents include, but not limited to, one or more of alcohols such as methanol, ethanol, and isopropanol, esters such as ethyl acetate, propyl acetate, and butyl acetate; ketones such as acetone, butanone, and cyclohexanone, benzenes such as toluene, and xylene, or the like. The solvent may have a boiling point of 50 to 150 degrees Celsius. Specifically, when the boiling point of the solvent is lower than 50 degrees Celsius, the solvent may have a high volatility, which may affect the thickness of the coating film 10 formed by coating. When the boiling point of the solvent is higher than 150 degrees Celsius, the drying process of the solvent becomes difficult, which may affect the formation efficiency of the coating film 10 and increase the process cost.

Referring to FIG. 1, an embodiment of the present disclosure provides a coating film 100, including: a first sub-coating film 10 that is same as the coating film described in the foregoing embodiments, and a second sub-coating film 20 disposed on a surface of the first sub-coating film 10 away from a film Sub. The second sub-coating film 20 may be a coating having a certain hardness, thereby providing the film Sub with a certain hardness and wear resistance. The first sub-coating film 10 may have a thickness of 10 nm to 1,000 nm, specifically 20 nm to 500 nm, and more specifically 50 nm to 200 nm. The second sub-coating film 20 may have a thickness of 1 μm to 10 μm, specifically 2 μm to 8 μm, and more specifically 3 μm to 6 μm. The second sub-coating film 20 may be formed on a surface of the first sub-coating film 10 away from the film Sub by a winding coating method. Specific examples of winding coating methods include, but not limited to, roller coating, gravure coating, reverse coating, roller brushing, dip coating, spray coating, spin coating, pneumatic blade coating, mold coating, or the like.

The first sub-coating film 10 included in the coating film 100 is the same as the coating film provided in the foregoing embodiments of the present disclosure, and thus the adhesion of the coating film 100 to the PMMA film is increased. When the second sub-coating film 20 comprises a component having a higher degree of functionality, the second sub-coating film 20 has a lower intramolecular stress when formed on the surface of the first sub-coating film 10 compared with the direct formation on the PMMA film, so that the second sub-coating film 20 is less prone to shrinkage, warping, cracking, or the like, which further improves the adhesion of the coating film 100 to the PMMA film.

The second sub-coating film 20 comprises a polyurethane acrylate oligomer having a functionality greater than or equal to six. Specifically, a higher functionality may bring a higher light curing activity, which is favorable for improving the crosslinking density. The second sub-coating film 20 comprises a polyurethane acrylate oligomer having a functionality greater than or equal to six, which enables the second sub-coating film 20 to form a more dense cross-linked structure after photocuring, thereby improving the mechanical properties of the second sub-coating film 20, and improving the hardness of the second sub-coating film 20.

The second sub-coating film 20 comprises a deca-functional polyurethane acrylate oligomer having a structure shown below:

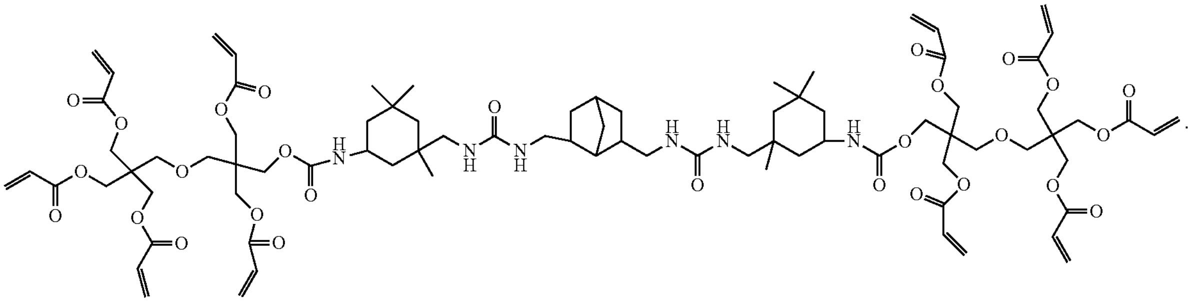 [SMILES: C=CC(=O)OCC(COCC(COC(=O)C=C)(COC(=O)C=C)COC(=O)NC1CC(C)(C)CC(C)(CNC(=O)NCC2CC3CC(CNC(=O)NCC4(C)CC(NC(=O)OCC(COCC(COC(=O)C=C)(COC(=O)C=C)COC(=O)C=C)(COC(=O)C=C)COC(=O)C=C)CC(C)(C)C4)C2C3)C1)(COC(=O)C=C)COC(=O)C=C]

A plurality of carbocyclic structures are introduced into the molecular structure of the deca-functional polyurethane acrylate oligomer as shown above, thereby further improving the overall rigidity of the molecular structure, in turn improving the mechanical properties of the second sub-coating film 20, further improving the hardness of the second sub-coating film 20. Moreover, the deca-functional polyurethane acrylate oligomer has partially same molecular structures as the tetrafunctional polyurethane acrylate oligomer in the first sub-coating film 10, thereby further increasing the intermolecular force between the second sub-coating film 20 and the first sub-coating film 10, and increasing the tightness and adhesion between the second sub-coating film 20 and the first sub-coating film 10.

The second sub-coating film 20 further comprises an acrylate monomer having a functionality greater than or equal to three, which can dissolve and dilute the polyurethane acrylate oligomer having a functionality greater than or equal to six in the second sub-coating film 20, thereby adjusting the viscosity of the components, participating in the curing process, and adjusting the curing rate and crosslinking performance of the second sub-coating film 20. In particular, specific examples of acrylate monomers having a functionality of greater than or equal to three herein include, but not limited to, one or more of trimethylolethane tri(meth)acrylate, trimethylolpropane tri(meth)acrylate, glycerol tri(meth)acrylate, pentaerythritol tri(meth)acrylate, di(trimethylolpropane) tri(meth)acrylate, dipentaerythritol tri(meth)acrylate, pentaerythritol tetra(meth)acrylate, di(trimethylolpropane) tetra(meth)acrylate, dipentaerythritol tetra(meth)acrylate, dipentaerythritol penta(meth)acrylate, di(trimethylolpropane) penta(meth)acrylate, dipentaerythritol hexa(meth)acrylate, or di(trimethylolpropane) hexa(meth)acrylate.

The second sub-coating film 20 further comprises a second photoinitiator. The second photoinitiator may, under irradiation by a light source, absorb energy at a certain wavelength, and produce active intermediates with the ability to initiate polymerization, such as free radicals and cations, thereby triggering the polymerization and crosslinking reaction of prepolymers and monomer components, and finally achieving curing. In particular, the second photoinitiator may include one or more of a type I photoinitiator or a type II photoinitiator. Specific examples of type I photoinitiators include, but not limited to, one or more of acetophenones such as 4-phenoxydichloroacetophenone, 4-tert-butyldichloroacetophenone, 4-tert-butyltrichloroacetophenone, diethoxyacetophenone, 2-hydroxy-2-methyl-1-phenylpropan-1-one, 1-(4-isopropylphenyl)-2-hydroxy-2-methylpropan-1-one, 1-(4-dodecylphenyl)-2-hydroxy-2-methylpropan-1-one, 4-(2-hydroxyethoxy)-phenyl(2-hydroxy-2-propyl) ketone, and 1-hydroxycyclohexylphenyl ketone; benzoins such as benzoin, benzoin methyl ether, benzoin ethyl ether, and benzyl dimethyl ketal; acylphosphine oxides or titanocene compounds. Specific examples of type II photoinitiators include, but are not limited to, one or more of benzophenones such as benzophenone, benzoylbenzoic acid, benzoylbenzoic acid methyl ether, 4-phenylbenzophenone, hydroxybenzophenone, 4-benzoyl-4'-methyldiphenyl sulfide, and 3,3'-dimethyl-4-methoxybenzophenone; thioxanthones, such as thioxanthone, 2-chlorothioxanthone, 2-methylthioxanthone, 2,4-dimethylthioxanthone, and isopropylthioxanthone, or the like.

The second sub-coating film 20 comprises 80 to 120 parts by weight of a polyurethane acrylate oligomer having a functionality greater than or equal to six, 10 to 30 parts by weight of an acrylate monomer having a functionality greater than or equal to three, and 1 to 10 parts by weight of a second photoinitiator. The term "parts by weight" refers to the mass of each component added. The actual weight of each "part" is not particularly limited, and may be 1 gram, 5 grams, 10 grams, 1 kilogram, 5 kilograms, 10 kilograms, or the like, which may be adjusted according to the requirements of the actual production scale, as long as the proportion of the components is ensured. Specifically, a mass of the polyurethane acrylate oligomer having a functionality greater than or equal to six:a mass of the acrylate monomer having a functionality greater than or equal to three:a mass of the second photoinitiator=(80 to 120):(10 to 30):(1 to 10). The above proportions may be based on the polyurethane acrylate oligomer having a functionality greater than or equal to six, and the proportions of the other components with respect to the polyurethane acrylate oligomer having a functionality greater than or equal to six may be freely adjusted within the ranges listed according to the requirements, and the adjustment of the proportions of one component does not affect the adjustment of the proportions of another component.

For ease of coating, the second sub-coating film 20 of the present disclosure further comprises a solvent. Specifically, the second sub-coating film 20 may comprise 200 to 300 parts by weight of a solvent, that is, a mass of the polyurethane acrylate oligomer having a functionality greater than or equal to six: a mass of the solvent=(80 to 120):(200 to 300), based on the polyurethane acrylate oligomer having a functionality greater than or equal to six. The proportions of the solvent to the polyurethane acrylate oligomer having a functionality greater than or equal to six may be freely adjusted as desired within the ranges listed. Specific examples of solvents include, but not limited to, one or more of alcohols such as methanol, ethanol, isopropanol, esters such as ethyl acetate, propyl acetate, butyl acetate; ketones such as acetone, butanone, cyclohexanone, benzenes such as toluene, xylene, or the like. The solvent may have a boiling point of 50 to 150 degrees Celsius. Specifically, when the boiling point of the solvent is lower than 50 degrees Celsius, the solvent may have a high volatility, which may affect the thickness of the coating film 10 formed by coating. When the boiling point of the solvent is higher than 150 degrees Celsius, the drying process of the solvent becomes difficult, which may affect the formation efficiency of the coating film 10 and increase the process cost.

Figure 2:
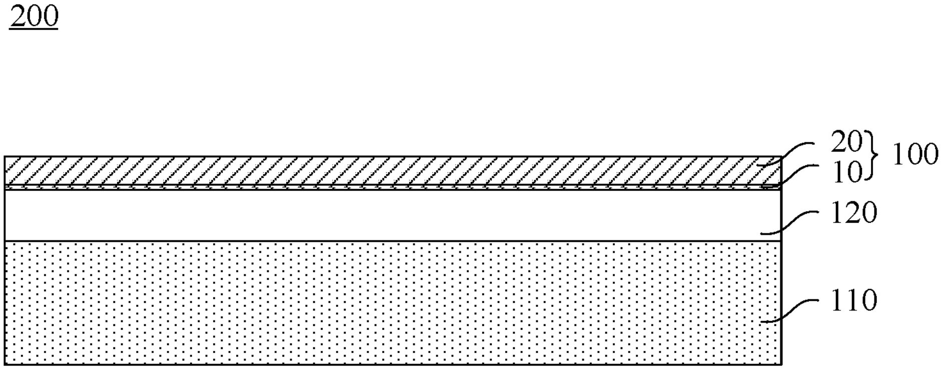
FIG. 2 is a schematic diagram of a display panel according to an embodiment of the present disclosure.

Referring to FIG. 2, an embodiment of the present disclosure provides a display panel 200, including a panel body 110, a polymethyl methacrylate film 120 disposed on a surface of the panel body 110, and a coating film 100 as described in the above embodiments and disposed on a surface of the polymethyl methacrylate film 120 away from the panel body 110. The panel body 110 may be an organic light-emitting diode (OLED) display panel, a quantum dot light-emitting diode (QLED) display panel, a Micro light-emitting diode (Micro-LED) display panel, a Mini light-emitting diode (Mini-LED) display panel, or a liquid crystal display panel.

Since the coating film 100 provided in the foregoing embodiments has a stronger adhesion to the polymethyl methacrylate (PMMA) film, the coating film 100 can be firmly and durably attached to the surface of the polymethyl methacrylate film 120 in the display panel 200 without being prone to shrinkage, warping, cracking, and other defects, thereby better protecting the overall surface of the display panel 200 and improving the durability of the display panel 200.

Hereinafter, the coating film and the display panel of the present disclosure will be described by specific examples.

Synthesis of tetrafunctional polyurethane acrylate oligomer P1 as follows

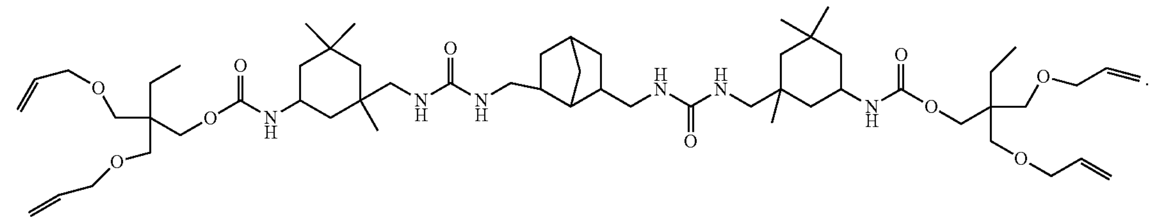 [SMILES: C=CCOCC(CC)(COCC=C)COC(=O)NC1CC(C)(C)CC(C)(CNC(=O)NCC2CC3CC(CNC(=O)NCC4(C)CC(NC(=O)OCC(CC)(COCC=C)COCC=C)CC(C)(C)C4)C2C3)C1]

First Step:

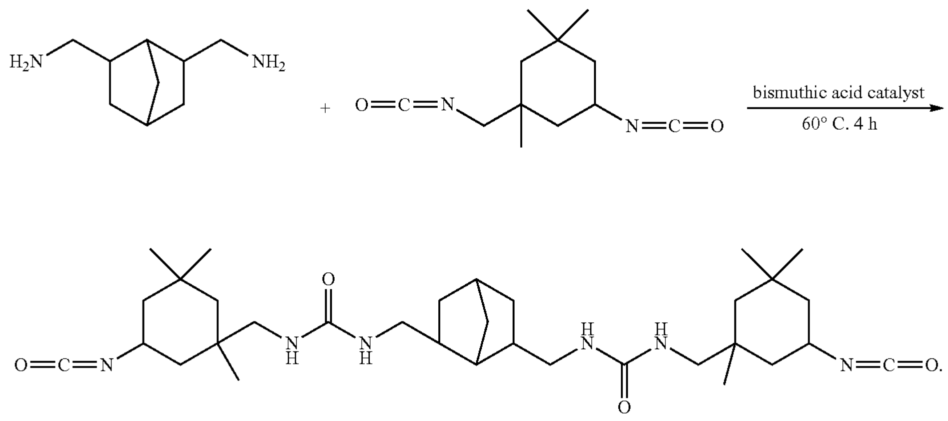

5 g of norbornane dimethylamine and 15 g of isophorone diisocyanate were dissolved in 10 g of dichloromethane, and then 0.1 g of bismuthic acid catalyst was added to react under a nitrogen atmosphere at 60 degrees Celsius for 4 hours to obtain an isocyano-terminated prepolymer A1.

Second Step:

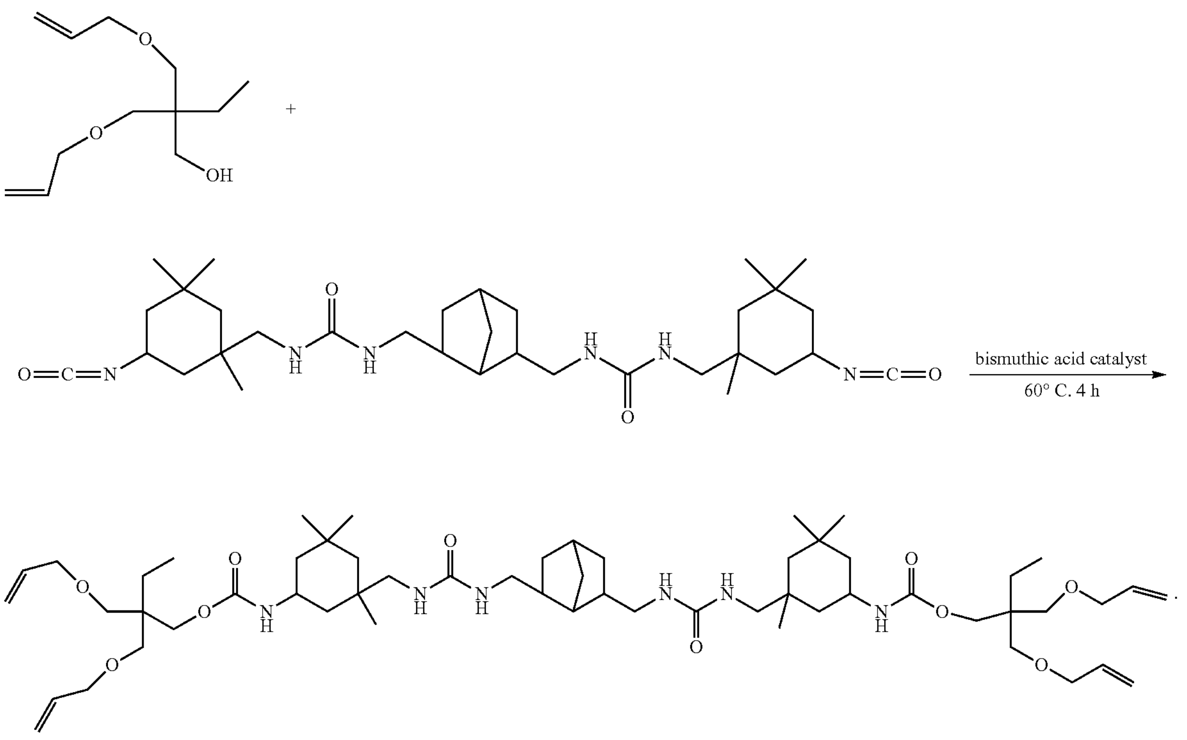

10 g of trimethylolpropane diallyl ether and 20 g of the prepolymer A1 obtained in the first step were dissolved in 10 g of methyl ethyl ketone, and then 0.1 g of bismuthic acid catalyst was added and reacted under a nitrogen atmosphere at 60 degrees Celsius for 4 hours to obtain the tetrafunctional polyurethane acrylate oligomer P1.

Preparation of Isocyanatoethyl Acrylate-Modified Nano-Silica Particles

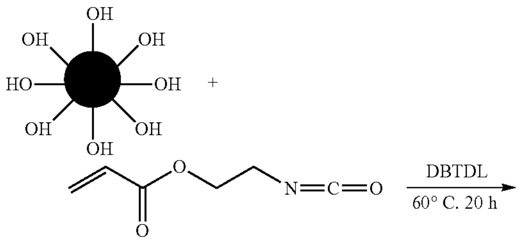

-continued

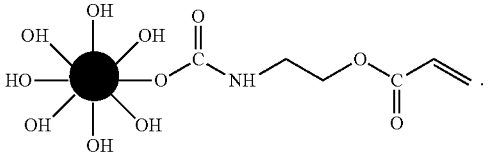

5 g of nano-silica particles were added to 10 g of butyl acetate, stirred and then ultrasonically dispersed, and then 0.5 g of isocyanatoethyl acrylate and 0.01 g dibutyltin dilaurate (DBTDL) were added, and reacted at 60 degrees Celsius for 20 hours to obtain a dispersion of isocyanatoethyl acrylate-modified nano-silica particles.

Synthesis of Deca-Functional Polyurethane Acrylate Oligomer P2

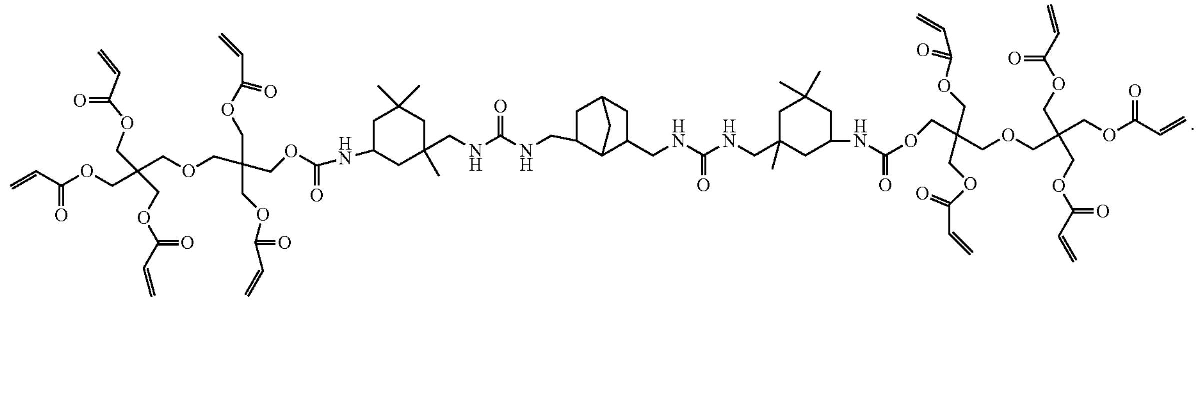 [SMILES: C=CC(=O)OCC(COCC(COC(=O)C=C)(COC(=O)C=C)COC(=O)NC1CC(C)(C)CC(C)(CNC(=O)NCC2CC3CC(CNC(=O)NCC4(C)CC(NC(=O)OCC(COCC(COC(=O)C=C)(COC(=O)C=C)COC(=O)C=C)(COC(=O)C=C)COC(=O)C=C)CC(C)(C)C4)C2C3)C1)(COC(=O)C=C)COC(=O)C=C]

First Step:

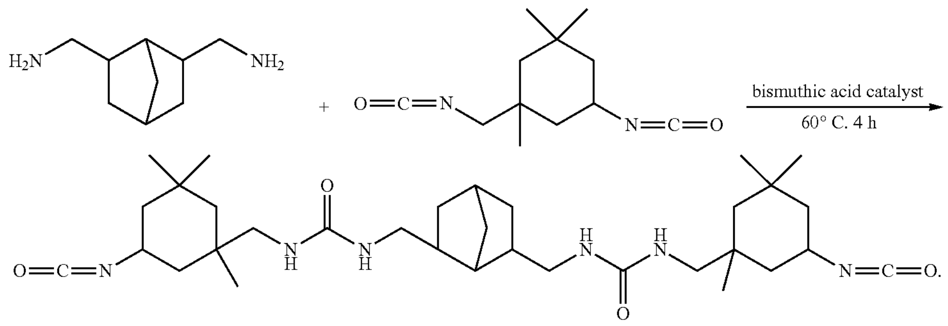

5 g of norbornane dimethylamine and 15 g of isophorone diisocyanate were dissolved in 10 g of dichloromethane, and then 0.1 g of bismuthic acid catalyst was added and reacted under a nitrogen atmosphere at 60 degrees Celsius for 4 hours to obtain an isocyano-terminated prepolymer A1.

Second Step:

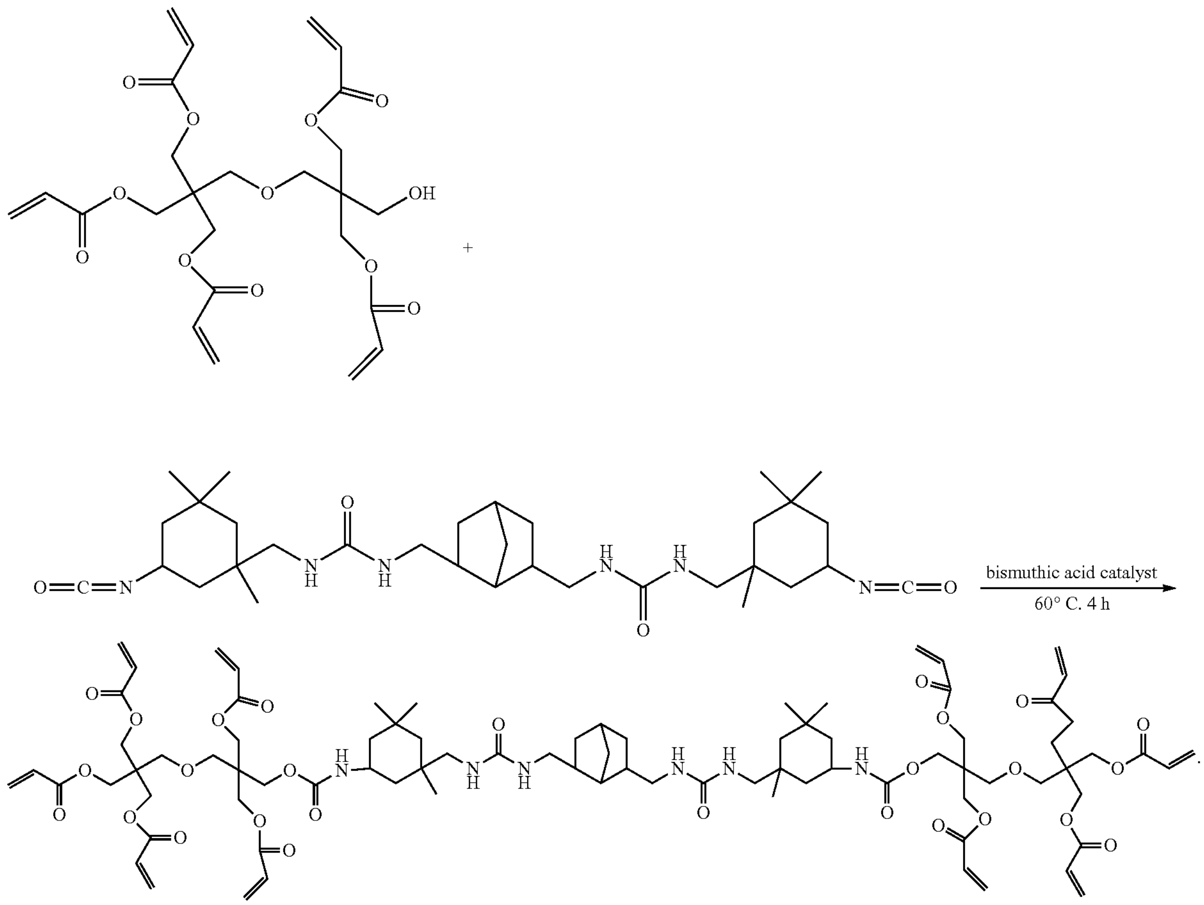

15 g of dipentaerythritol pentaacrylate and 20 g of the prepolymer A1 obtained in the first step were dissolved in 10 g of methyl ethyl ketone, and then 0.1 g of bismuthic acid catalyst was added and reacted under a nitrogen atmosphere at 60 degrees Celsius for 4 hours to obtain the deca-functional polyurethane acrylate oligomer P2.

Example 1: Preparation of Hard Coating Film HC1

Preparation of a first sub-coating film: a first sub-coating film composition was roller coated on a PMMA film, dried to remove the solvent using an oven at 60 to 120 degrees Celsius, and then cured by UV light with energy of 100 to 1,000 mJ/$cm^2$ to form the first sub-coating film having a thickness of 50 to 200 nm.

Preparation of a second sub-coating film: a second sub-coating film composition was roller coated on the formed first sub-coating film, dried to remove the solvent using an oven at 60 to 120 degrees Celsius, and then cured by UV light with energy of 100 to 1,000 mJ/$cm^2$ to form the second sub-coating film having a thickness of 3 to 6 μm.

The specific components of the first sub-coating film and the second sub-coating film and the proportion of these components are shown as follows:

Components of the First Sub-Coating Film:

| Components | Parts by weight |
|---|---|
| Tetrafunctional polyurethane acrylate oligomer P1 | 100 |
| Isocyanatoethyl acrylate-modified nano-silica particles | 5 |
| 1-Hydroxycyclohexylphenyl ketone | 2 |
| Methyl isobutyl ketone | 4200 |

Components of the Second Sub-Coating Film:

| Components | Parts by weight |
|---|---|
| Deca-functional polyurethane acrylate oligomer P2 | 100 |
| Pentaerythritol tetraacrylate | 20 |
| 2-hydroxy-2-methyl-1-phenylpropan-1-one | 5 |
| Butyl acetate | 230 |

Example 2: Preparation of Hardened Coating Film HC2

The hardened coating film HC2 can be prepared by the same method as that in Example 1, except that the specific components and the proportions of the components of a first sub-coating film and a second sub-coating film are different. The specific components of the first sub-coating film and the second sub-coating film and the respective component proportions are shown as follows:

Components of the First Sub-Coating Film:

| Components | Parts by weight |
|---|---|
| Tetrafunctional polyurethane acrylate oligomer P1 | 100 |
| Pentaerythritol tetraacrylate | 8 |
| 2-hydroxy-2-methyl-1-phenylpropan-1-one | 3 |
| Butanone | 4500 |

Components of the Second Sub-Coating Film:

| Components | Parts by weight |
|---|---|
| Deca-functional polyurethane acrylate oligomer P2 | 100 |
| Dipentaerythritol pentaacrylate | 15 |
| 1-(4-dodecylphenyl)-2-hydroxy-2-methylpropan-1-one | 4 |
| Ethyl acetate | 260 |

Performance Evaluation of Hard Coating Film

Evaluation of adhesion performance: a cross-cut test was performed. Specifically, 10×10 grids (i.e., total 100 grids) of 1 mm×1 mm were scribed on the surface of the hardened coating film with a cross-cut test tester. After removal of the debris, the grids to be tested were firmly adhered with a 3M adhesive tape, and then the adhesive tape was quickly pulled off in the vertical direction to observe the peeling phenomenon of the coating.

Adhesion Test Standard Results:

5B, Edges of the cuts are smooth, and none of the squares of the lattice is detached at both the edges and the intersections of the cuts.

4B, Small flakes of coating are detached at the intersections of the cuts, and less than 5% of the total area is affected.

3B, Small flakes of coating are detached along edges and intersections of the cuts, and 5% to 15% of the total area are affected.

2B, Big flakes of coating are detached at the edges and intersections of the cuts, and 15% to 35% of the total area are affected.

1B, Big flakes of coating are detached at the edges and intersections of the cuts, and 35% to 65% of the total area are affected.

0B, the area of peeling off exceeds the standard of 1B.

Evaluation of pencil hardness: the surface of the hardened coating film was scribed with Mitsubishi pencils having a hardness of H to 9H under a load of 750 g, respectively, and then the surface of the hardened coating film was observed to determine whether there are scratches or not. The maximum pencil hardness that the hardened coating film surface can withstand without scratching was detected.

Evaluation of friction resistance: the surface of the hardened coating film was rubbed with steel wool (000#) back and forth under a load of 500 g, and the number of friction cycles at the occurrence of scratches was recorded.

Performance evaluation results of hardened coating films HC1 and HC2

| Performance | HC1 | HC2 |
|---|---|---|
| Adhesion | 5B | 5B |
| Pencil hardness (750 g) | 4H | 5H |
| Friction resistance (500 g) | 20 | 30 |

From the above table, it can be seen that the hardened coating films HC1 and HC2 provided in the embodiments of the present disclosure have an adhesion level of 5B to the PMMA film in the cross-cut test, indicating that the hardened coating films HC1 and HC2 provided in the embodiments of the present disclosure have no obvious peeling off in the cross-cut test after being formed on the PMMA film, and have excellent adhesion to the PMMA film.

In addition, the hardened coating films HC1 and HC2 have a pencil hardness (750 g) of >4H and a friction resistance (500 g) of >20 cycles, indicating that the hardened coating films HC1 and HC2 can impart a strong hardness and wear resistance to the surface of the PMMA film.

An embodiment of the present disclosure provide a coating film including a tetrafunctional polyurethane acrylate oligomer having a structure as shown below:

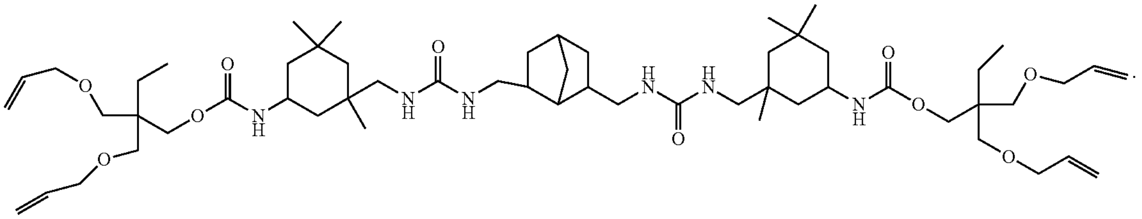 [SMILES: C=CCOCC(CC)(COCC=C)COC(=O)NC1CC(C)(C)CC(C)(CNC(=O)NCC2CC3CC(CNC(=O)NCC4(C)CC(NC(=O)OCC(CC)(COCC=C)COCC=C)CC(C)(C)C4)C2C3)C1]

In some embodiments of the present disclosure, the coating film further includes nano-silica particles.

In some embodiments of the present disclosure, the nano-silica particles include isocyanatoethyl acrylate-modified nano-silica particles.

In some embodiments of the present disclosure, the nano-silica particles have a size of 10 to 1,000 nm.

In some embodiments of the present disclosure, the coating film further includes a first photoinitiator.

In some embodiments of the present disclosure, the coating film includes 80 to 120 parts by weight of the tetrafunctional polyurethane acrylate oligomer; 1 to 10 parts by weight of the nano-silica particles; and 1 to 10 parts by weight of the first photoinitiator.

An embodiment of the present disclosure provides a coating film including:

a first sub-coating film including a tetrafunctional polyurethane acrylate oligomer having a structure as shown below:

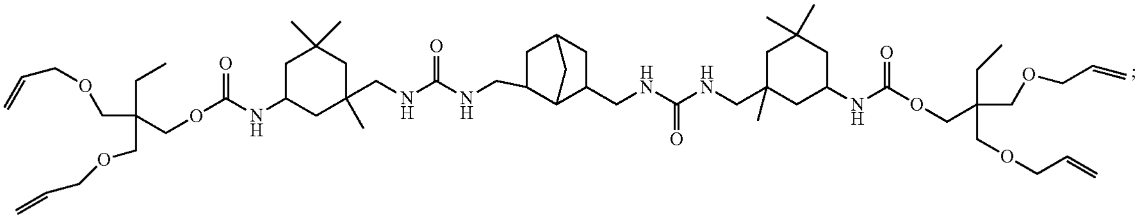 [SMILES: C=CCOCC(CC)(COCC=C)COC(=O)NC1CC(C)(C)CC(C)(CNC(=O)NCC2CC3CC(CNC(=O)NCC4(C)CC(NC(=O)OCC(CC)(COCC=C)COCC=C)CC(C)(C)C4)C2C3)C1]

and a second sub-coating film disposed on a surface of the first sub-coating film.

In some embodiments of the present disclosure, the first sub-coating film further includes nano-silica particles.

In some embodiments of the present disclosure, the nano-silica particles include isocyanatoethyl acrylate-modified nano-silica particles.

In some embodiments of the present disclosure, the nano-silica particles have a size of 10 to 1,000 nm.

In some embodiments of the present disclosure, the first sub-coating film further includes a first photoinitiator.

In some embodiments of the present disclosure, the first sub-coating film includes 80 to 120 parts by weight of the tetrafunctional polyurethane acrylate oligomer; 1 to 10 parts by weight of the nano-silica particles; and 1 to 10 parts by weight of the first photoinitiator.

In some embodiments of the present disclosure, the second sub-coating film includes a polyurethane acrylate oligomer having a functionality greater than or equal to six.

In some embodiments of the present disclosure, the second sub-coating film includes a deca-functional polyurethane acrylate oligomer having a structure as shown below:

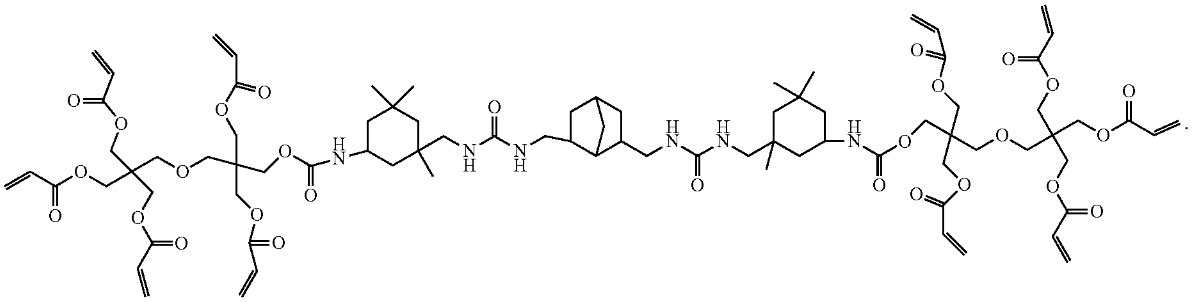 [SMILES: C=CC(=O)OCC(COCC(COC(=O)C=C)(COC(=O)C=C)COC(=O)NC1CC(C)(C)CC(C)(CNC(=O)NCC2CC3CC(CNC(=O)NCC4(C)CC(NC(=O)OCC(COCC(COC(=O)C=C)(COC(=O)C=C)COC(=O)C=C)(COC(=O)C=C)COC(=O)C=C)CC(C)(C)C4)C2C3)C1)(COC(=O)C=C)COC(=O)C=C]

In some embodiments of the present disclosure, the second sub-coating film further includes an acrylate monomer having a functionality greater than or equal to three and a second photoinitiator.

In some embodiments of the present disclosure, the second sub-coating film includes 80 to 120 parts by weight of the deca-functional polyurethane acrylate oligomer; 10 to 30 parts by weight of an acrylate monomer having the functionality greater than or equal to three; and 1 to 10 parts by weight of the second photoinitiator.

In some embodiment of the present disclosure, the first sub-coating film has a thickness of 10 to 1,000 nm, and the second sub-coating film has a thickness of 1 to 10 μm.

An embodiment of the present disclosure further provides a display panel including:

- a panel body;
- a polymethyl methacrylate film disposed on a surface of the panel body; and
- a coating film disposed on a surface of the polymethyl methacrylate film away from the panel body, wherein the coating film includes a sub-coating film including tetrafunctional polyurethane acrylate oligomer having a structure as follows:

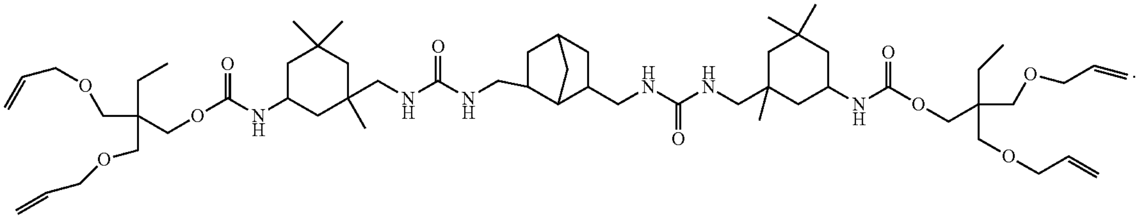 [SMILES: C=CCOCC(CC)(COCC=C)COC(=O)NC1CC(C)(C)CC(C)(CNC(=O)NCC2CC3CC(CNC(=O)NCC4(C)CC(NC(=O)OCC(CC)(COCC=C)COCC=C)CC(C)(C)C4)C2C3)C1]

In some embodiment of the present disclosure, the coating film comprises another sub-coating film on a surface of the coating film.

In some embodiment of the present disclosure, the another sub-coating film comprises a polyurethane acrylate oligomer having a functionality greater than or equal to six.

The above detailed description of a coated film and a display panel provided by the embodiments of the present application is provided, and the above description of the embodiments of the present disclosure is merely intended to assist in understanding the method of the present disclosure and its core idea, and should not be construed as limiting the scope of protection of the present disclosure.

What is claimed is:

1. A coating film comprising a tetrafunctional polyurethane acrylate oligomer, wherein the tetrafunctional polyurethane acrylate oligomer has a structure as follows:

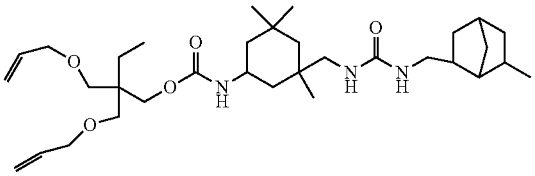

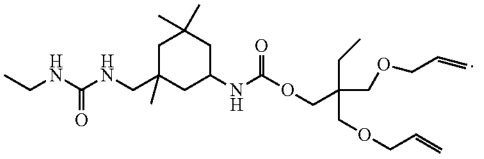

2. The coating film according to claim 1, further comprising nano-silica particles.

3. The coating film according to claim 2, wherein the nano-silica particles comprise isocyanatoethyl acrylate-modified nano-silica particles.

4. The coating film according to claim 2, wherein the nano-silica particles have a size of 10 to 1,000 nm.

5. The coating film according to claim 2, further comprising a first photoinitiator.

6. The coating film according to claim 5, wherein the coating film comprises 80 to 120 parts by weight of the tetrafunctional polyurethane acrylate oligomer;

1 to 10 parts by weight of the nano-silica particles; and 1 to 10 parts by weight of the first photoinitiator.

7. A coating film comprising:

a first sub-coating film comprising a tetrafunctional polyurethane acrylate oligomer, wherein the tetrafunctional polyurethane acrylate oligomer has a structure as shown below:

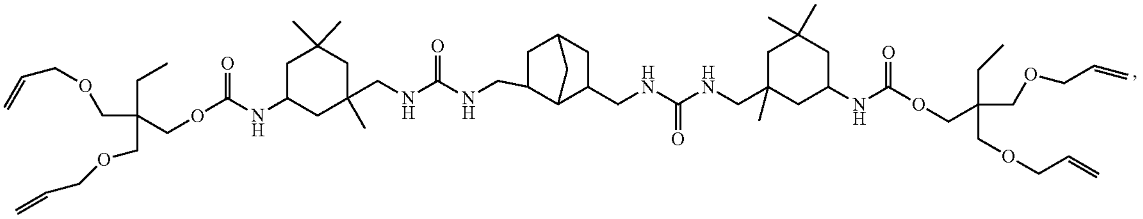 [SMILES: C=CCOCC(CC)(COCC=C)COC(=O)NC1CC(C)(C)CC(C)(CNC(=O)NCC2CC3CC(CNC(=O)NCC4(C)CC(NC(=O)OCC(CC)(COCC=C)COCC=C)CC(C)(C)C4)C2C3)C1]

and a second sub-coating film disposed on a surface of the first sub-coating film.

8. The coating film according to claim 7, wherein the first sub-coating film further comprises nano-silica particles.

9. The coating film according to claim 8, wherein the nano-silica particles comprise isocyanatoethyl acrylate-modified nano-silica particles.

10. The coating film according to claim 8, wherein the nano-silica particles have a size of 10 to 1,000 nm.

11. The coating film according to claim 7, wherein the first sub-coating film further comprises a first photoinitiator.

12. The coating film according to claim 11, wherein the first sub-coating film comprises 80 to 120 parts by weight of the tetrafunctional polyurethane acrylate oligomer;

1 to 10 parts by weight of the nano-silica particles; and 1 to 10 parts by weight of the first photoinitiator.

13. The coating film according to claim 7, wherein the second sub-coating film comprises a polyurethane acrylate oligomer having a functionality greater than or equal to six.

14. The coating film according to claim 13, wherein the second sub-coating film comprises a deca-functional polyurethane acrylate oligomer having a structure as follows:

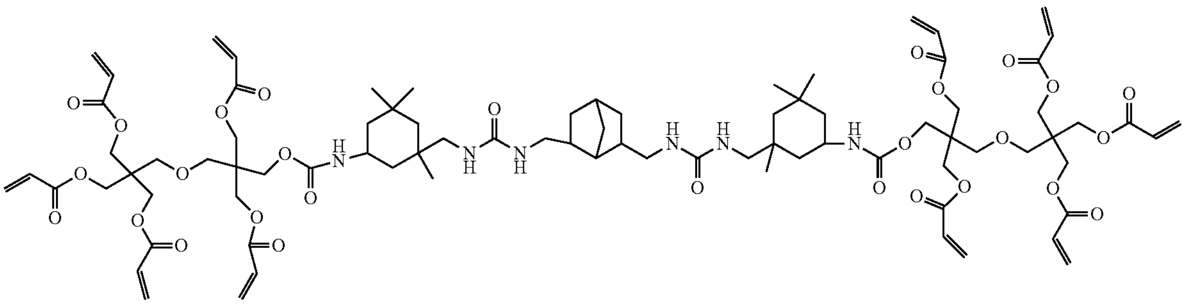

15. The coating film according to claim 13, wherein the second sub-coating film further comprises an acrylate monomer having a functionality greater than or equal to three and a second photoinitiator.

16. The coating film according to claim 15, wherein the second sub-coating film comprises 80 to 120 parts by weight of the polyurethane acrylate oligomer having the functionality greater than or equal to six;

10 to 30 parts by weight of the acrylate monomer having the functionality greater than or equal to three; and 1 to 10 parts by weight of the second photoinitiator.

17. The coating film according to claim 7, wherein the first sub-coating film has a thickness of 10 to 1,000 nm, and the second sub-coating film has a thickness of 1 to 10 μm.

18. A display panel comprising:

a panel body;

a polymethyl methacrylate film disposed on a surface of the panel body; and a coating film disposed on a surface of the polymethyl methacrylate film away from the panel body, wherein the coating film comprises a sub-coating film, and the sub-coating film comprises tetrafunctional polyurethane acrylate oligomer having a structure as follows:

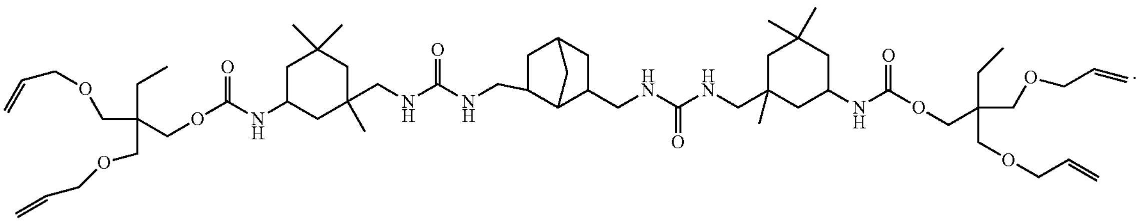 [SMILES: C=CCOCC(CC)(COCC=C)COC(=O)NC1CC(C)(C)CC(C)(CNC(=O)NCC2CC3CC(CNC(=O)NCC4(C)CC(NC(=O)OCC(CC)(COCC=C)COCC=C)CC(C)(C)C4)C2C3)C1]

19. The display panel according to claim 18, wherein the coating film comprises another sub-coating film on a surface of the coating film.

20. The display panel according to claim 19, wherein the another sub-coating film comprises a polyurethane acrylate oligomer having a functionality greater than or equal to six.

* * * * *